United States Patent [19]

Hoffmeister

[11] Patent Number: 4,566,609

[45] Date of Patent: Jan. 28, 1986

[54] COMPOSITE TANKAGE ARRANGEMENT FOR LIQUID FUEL EXPULSION

[75] Inventor: Lawrence D. Hoffmeister, New Market, Ala.

[73] Assignee: The United States of America as represented by the Secretary of the Army, Washington, D.C.

[21] Appl. No.: 596,341

[22] Filed: Apr. 3, 1984

[51] Int. Cl.$^4$ ............................................. B67D 5/42
[52] U.S. Cl. .................................. 222/130; 222/389; 220/3; 220/414; 138/31
[58] Field of Search ............... 220/3, 85 A, 85 B, 20, 220/414; 222/129, 130, 131, 135, 183, 251, 326, 386, 389, 396, 397; 138/26, 31

[56] References Cited

U.S. PATENT DOCUMENTS

| | | | |
|---|---|---|---|
| 3,000,542 | 9/1961 | Longenecker et al. | 222/389 X |
| 3,557,827 | 1/1971 | Marsh | 137/590 |
| 3,815,773 | 6/1974 | Duvall et al. | 220/3 |
| 4,040,163 | 8/1977 | Tronsberg | 220/3 X |
| 4,191,304 | 3/1980 | Schiedat | 220/3 X |
| 4,360,116 | 11/1982 | Humphrey | 220/3 |
| 4,438,858 | 3/1984 | Grover | 220/3 |

Primary Examiner—Joseph J. Rolla
Assistant Examiner—Michael S. Huppert
Attorney, Agent, or Firm—Anthony T. Lane; Robert P. Gibson; James T. Deaton

[57] ABSTRACT

A composite packaging arrangement for dispensing a liquid monopropellant fuel comprising a first inner tank that is made of composite materials and a second and outer tank that has a dome structure at one end that is made of epoxy material that is bonded to one end of the first tank and the second tank includes a cylindrical intermediate structure that is bonded to the epoxy dome structure and has a remote end dome structure of nylon secured in a sealing arrangement to the cylindrical intermediate structure with composite material mounted on the outer surface of the second tank to provide a lightweight compact tankage arrangement.

5 Claims, 1 Drawing Figure

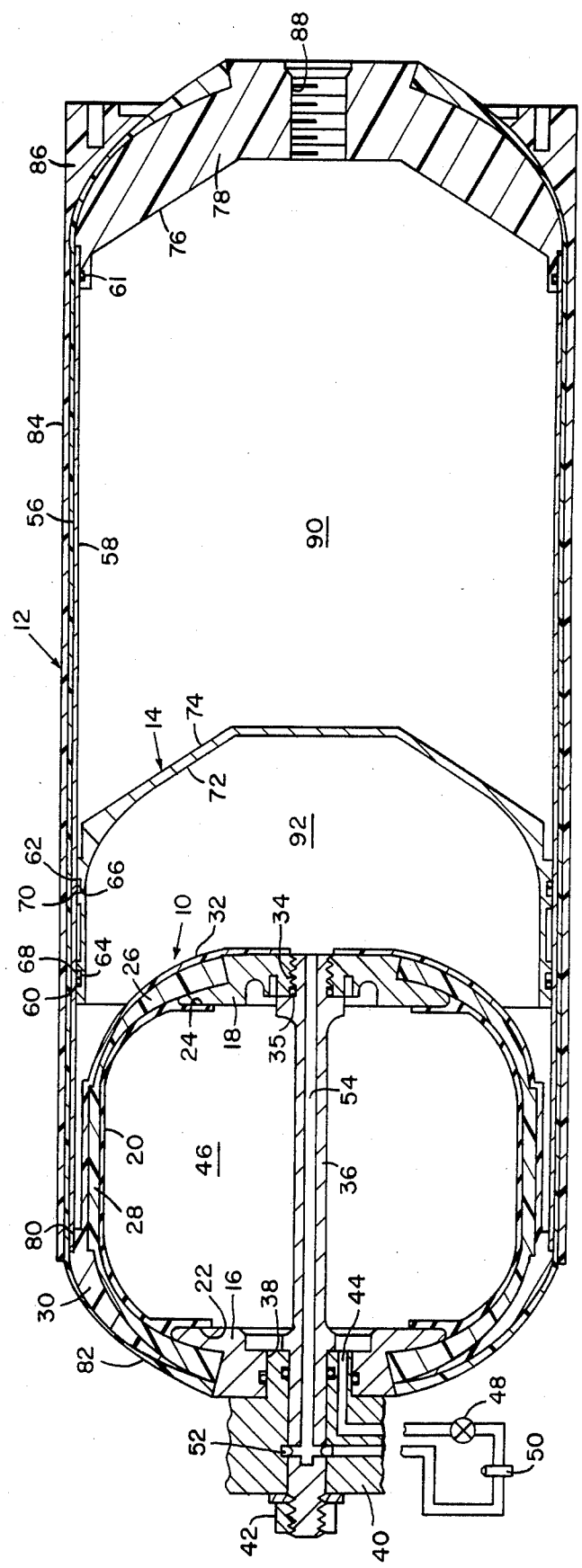

COMPOSITE TANKAGE ARRANGEMENT FOR LIQUID FUEL EXPULSION

DEDICATORY CLAUSE

The invention described herein may be manufactured, used, and licensed by or for the Government for governmental purposes without the payment to me of any royalties thereon.

BACKGROUND OF THE INVENTION

In the past, various packaging systems have been provided, however they do not provide as lightweight and economical packaging arrangement as needed. The weight of the system and the materials used in the system often determine a particular missile system to which the packaging arrangement can be used and further, when used with a liquid propellant system as desired here, the expulsion of that liquid propellant requires a source of pressure.

With the above needs in mind, it is an object of this invention to provide a compact, lightweight and relatively economical gas expulsion arrangement.

Another object of this invention is to provide a composite arrangement in which a minimal amount of metal structure is used in the arrangement.

Still another object of this invention is to provide an expulsion arrangement that produces a structure that can withstand relatively high pressures without unwanted leakage.

Other objects and advantages of this invention will be obvious to those skilled in this art.

SUMMARY OF THE INVENTION

In accordance with this invention, an economical composite packaging arrangement for liquid propellant is provided that includes a first tank enclosed within a second tank with a piston mounted in the second tank and shaped to expel liquid propellant and still maintain a good seal between the pressurizing fluid and the liquid propellant, and the first and second tanks being molded and bonded into an integral structure at one end.

BRIEF DESCRIPTION OF THE DRAWINGS

FIG. 1 is a sectional view of a composite tankage arrangement in accordance with this invention.

DESCRIPTION OF THE PREFERRED EMBODIMENT

Referring now to the drawing, a composite arrangement for liquid fuel expulsion in accordance with this invention includes an inner tank 10, an outer tank 12 and a piston 14 mounted for expelling fuel from the tankage arrangement. Inner tank 10 includes end structures 16 and 18 that are preferrably made of aluminum or an aluminum alloy. An inner liner 20 of isoprene rubber is fiber filled with silicon glass and this inner liner 20 is bonded with conventional adhesive for bonding rubber to metal at surfaces 22 and 24 of end members 16 and 18. Helical layers 26 and hoop layers 28 at the cylindrical portion of the tank are provided and these layers are alternated first as a helical layer and then a hoop layer at the cylindrical portion until sufficient strength is provided for the tank. About 5 or 6 layers of each is generally sufficient. The helical and hoop layers are made of conventional composite material such as fiberglass, graphite, Kevlar or other conventional composite materials. These composite materials are epoxy impregnated and allowed to cure after they have been applied. An outer epoxy end structure 30 is molded to the outer surface at one end of tank 10 as illustrated to provide an end structure for tank 12. This end structure 30 is secured to tank 10 by placing one end of tank 10 in a mold and casting epoxy material 30 into the mold and curing the epoxy material to bond the material to tank 10. The remainder of the outer surface of tank 10 has an epoxy sealing layer 32 applied thereto for insuring that the outer surface of tank 10 is made completely impervious. Tank 10 is designed to have a burst pressure of 7,500 psi and is designed to continuously operate at a pressure of 5,000 psi. End structure 30 and sealing layer 32 are each made of conventional epoxy sealant materials that are compatible with the epoxy on the helical and hoop layers. End member 18 is threaded at 34 and a center tube member 36 has one end threaded into threads 34 and a seal 35 is provided for sealing between center tube 36 and end member 18. End member 16 has an opening 38 therethrough and a manifold type structure 40 is sealably mounted about center tube 36 and in opening 38. Manifold 40 is secured in place by securing means 42 on center member 36. Manifold structure 40 has openings 44 that communicate from chamber 46 in tank 10 to an on-off valve 48 and pressure regulator 50 and from pressure regulator 50 to chamber 52 that communicates with center passage 54 of center tube 36. End structure 30 forms a forward dome as an integral part of high pressure tank or bottle 10 by being molded as a geodesic isotensoid dome to the forward half of high pressure bottle 10. High pressure bottle 10 is placed in a mold with a void space defined between the mold and high pressure bottle 10. This void space is filled with an epoxy resin in a conventional manner to form end structure 30. Also, thin coat 32 of epoxy, applied over the remaining exposed surface of high pressure bottle 10, serves to completely seal the high pressure bottle. This high pressure bottle 10 is designed to maintain the high pressure over a moderate length of time, but should not be utilized for long time storage as the high pressure gas could conceivably permeate bladder 20. Outer tank 12 further includes an internal cylindrical sleeve 56 that is preferably made of a metal such as aluminum or aluminum alloy and sleeve 56 has an internal surface 58 which is preferably impregnated with teflon to provide a relatively slick and sealing surface that can be easily sealed relative to a piston such as piston 14 by the use of O-rings 60 and 62 that are mounted in grooves 64 and 66 of piston 14 with each O-ring having an anti-extrusion ring 68 and 70 as illustrated for keeping the O-rings from extruding into the clearance space between the outer surface of piston 14 and the inner surface of cylinder 56. Piston 14 has an inner surface 72 that is contoured generally to the outer surface of one end of inner tank 10 to provide a minimum volume of dead space between these two members. Piston 14 has outer surface 74 that is contoured to fit internal surface 76 of end member 78. End member 78 is telescoped into one end of cylinder 56 and an O-ring 61 seals between cylinder 56 and end member 78. At the other end, cylinder member 56 is slide over flange 80 formed on epoxy dome member 30 and epoxy is used to bond and seal this end of cylinder 56 to flange 80 of epoxy dome structure 30. This forms a leaktight seal between epoxy dome structure 30 and the end of cylinder 56. The outer surface of tank 12 has a helical layer 82 and hoop layer 84 applied thereto to provide sufficient strength for tank 12. Helical layers 82 and hoop layers 84 may be increased in number if desired. The composite material used in the helical and hoop layers can be selected from materials such as fiberglass, graphite, Kevlar, etc., but preferably they are Kavlar. Other conventional composite materials could be used provided the materials have sufficient strength for supporting the tank structure. The composite materials are bonded together with an epoxy in conventional manner. A flange 86 is provided for securing the outer tank to a rocket motor or support and is wound and machined in a conventional manner at one end of tank 12 as illustrated. End member 78 is preferably made of nylon and has a threaded opening 88 therein that is provided for communicating fuel from chamber 90 to a rocket motor as desired. As can be seen, a chamber 92 is formed between piston 14 and inner tank 10 to provide a chamber for pressurized fluid to act on side 72 of piston 14 to cause fuel in chamber 90 to be expelled at passage 88. With the nesting arrangement of piston 14 with the end structure of tank 10 as well as the similar nesting structure of surface 74 of piston 14 with inner surface 76 of end structure 78 causes a minimum amount of dead space relative to tanks 10 and 12 and therefore causes the tanks to be made as small and light as possible. It is also pointed out that the particular structure of piston 14 and end structure 78 is such that almost all the fuel in chamber 90 will be expelled. Inner tank 10 is preferably made to have a burst pressure of about 7,500 pounds and is designed to withstand pressures therein for an extended period at about 5,000 pounds. Outer tank 12 is designed to carry pressure of about 900 pounds safely in chamber 92 to expell the monopropellant in chamber 90.

In operation, with inner tank 10 filled with an inert gas such as nitrogen, and with chamber 90 filled with a desired fuel such as a monopropellant of hydrazine, on-off valve 48 is opened and regulator 50 regulates the pressure from say 5,000 psi to 900 psi and the inert gas is delivered through passage 54 to chamber 92 for moving piston 14 against the fuel in chamber 90 to expell the fuel through opening 88 to a motor (not shown) which receives the fuel. As fuel from chamber 90 is expelled and piston 14 approaches end member 78, the outer surface 74 of piston 14 nest with surface 76 of end member 78 and almost all the fuel from chamber 90 is expelled.

It will be appreciated that the tank structures and expulsion system, in accordance with this invention, have the advantage of being made almost entirely of composite material with a small amount of lightweight aluminum material therein and therefore has the advantage of being much lighter in weight than conventional metal tankage systems of equal pressure capacity due to high specific strength of composite materials. In addition, a high packaging advantage exists due to high volume efficiency which results from the compact composite tank arrangement and the nesting of the piston over the internal high pressure bottle and nesting the piston with the internal surface of one of the end structures of the outer bottle. It should also be appreciated that this structure of the inner and outer tank has a unique feature of having the outer tank with an end dome structure that is made of epoxy material and bonded to the inner tank and the inner cylindrical structure of the outer tank to dispense with the use of a metal member that requires machining and separate sealing and securing means.

I claim:

1. A composite tankage arrangement comprising a first tank having dome shaped members at opposite ends with a cylindrical intermediate portion between said dome shaped members and said first tank having composite reinforcing materials for allowing a chamber therein to contain high pressure fluid, said first tank having at one end an epoxy dome-like structure of a second tank bonded to an outer surface of the dome structure of said first tank to define a dome structure for said second tank, a cylindrical metal member extending over a portion of said first tank and having one end bonded to said epoxy dome-like structure and having at an opposite end of said cylindrical member a dome structure telescoped and sealed thereto, and a multiplicity of helical layers of composite materials mounted over said epoxy dome-like structure, said cylindrical member and said telescoped dome structure, and hoop layers mounted over a cylindrical portion of the helical layers that extend from over a portion of said epoxy dome-like structure to over a portion of said telescoped dome structure to complete said second tank that completely surrounds said first tank and is integral with said first tank for providing a fuel expulsion tankage arrangement with said first tank within said second tank.

2. A composite tankage arrangement as set forth in claim 1, wherein said cylindrical member has an inner surface that is impregnated with teflon and a piston is mounted inside said cylindrical member to define chambers on opposite sides of said piston.

3. A composite tankage arrangement as set forth in claim 1, wherein said first tank has the outer surface thereof from said epoxy dome structure to the other end of said first tank coated with an epoxy material to provide an impervious seal over the outer surface of said first tank.

4. A composite tankage arrangement as set forth in claim 1, wherein said telescoped dome structure of said second tank at said opposite end is made of nylon and has an opening therethrough for expulsion of fuel therethrough, and the inner surface of said nylon dome structure has a configuration that is the same as an outer configuration of a piston that is sealably and slidably mounted in said cylindrical member.

5. A composite tankage arrangement as set forth in claim 1, wherein said cylindrical intermediate portion is made of isoprene rubber impregnated with silicon glass and said cylindrical intermediate portion is bonded to said dome shaped members at opposite ends.

* * * * *